Sept. 6, 1932.  J. E. GOLDEN ET AL  1,875,588
SEAT ADJUSTING DEVICE FOR AUTOMOBILE SEATS
Filed Oct. 14, 1929
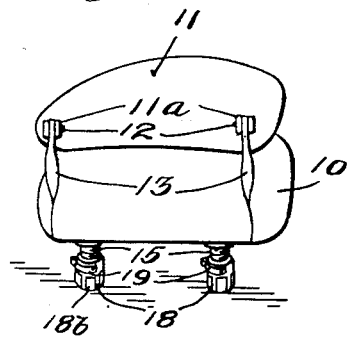
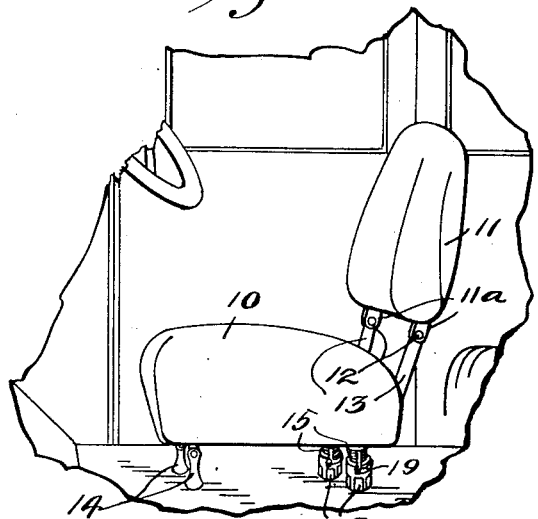
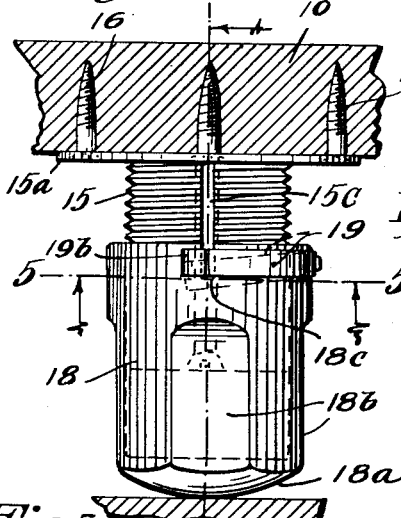
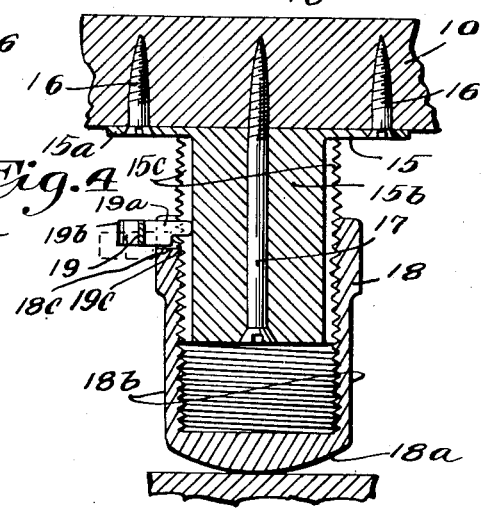
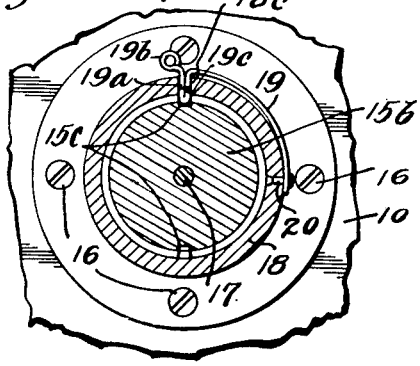
Inventors
John E. Golden
Orville B. Golden
By their Attorneys Patented Sept. 6, 1932

1,875,588

UNITED STATES PATENT OFFICE

JOHN E. GOLDEN AND ORVILLE WILIAM GOLDEN, OF MINNEAPOLIS, MINNESOTA; SAID JOHN E. GOLDEN ASSIGNOR TO SAID ORVILLE W. GOLDEN

SEAT ADJUSTING DEVICE FOR AUTOMOBILE SEATS

Application filed October 14, 1929. Serial No. 399,519.

This invention relates to an elevating device for a seat and particularly to such a device for an automobile seat. As is well known, some types of automobiles, such as the coach, have front seats which have seat portions pivoted adjacent their front ends so that the seats can be swung forwardly. Such seat portions usually also have a pair of rear legs supporting the same. It is desirable to have means for raising and lowering the rear end of the seat so that the seat can be adjusted to suit the driver of the automobile.

It is an object of this invention to provide a simple and efficient seat elevating means constructed and arranged to be used on an automobile seat by means of which the seat can be easily and quickly adjusted to suit the comfort and convenience of the driver.

It is a further object of the invention to provide a seat elevating device for an automobile comprising a member having a flange adapted to be attached to the seat and having a projecting exteriorly threaded stem, together with a shell threaded on said stem and having means for holding the same in different positions on said stem.

It is more specifically an object of the invention to provide a seat elevating device comprising a member having a flange with holes therethrough for receiving attaching means having a projecting exteriorly threaded stem also having a hole extending therethrough for receiving an attaching means, said stem having a narrow groove extending along one side together with a shell threaded on said stem and having a spring secured thereto with a portion adapted to enter the groove in said stem to hold said shell in different positions thereon, said shell having a closed lower end with a rounded surface and preferably being formed with flat surfaces in angular arrangement.

These and other objects and advantages of the invention will be fully set forth in the following description made in connection with the accompanying drawing, in which like reference characters refer to similar parts throughout the several views, and in which:—

Fig. 1 is a perspective view in rear elevation of an automobile seat showing the same with the top folded down;

Fig. 2 is a perspective view showing portions of the interior of an automobile including a seat, the back of the seat being shown in operative position;

Fig. 3 is a view in side elevation of the seat elevating device, portions of the leg and floor of the automobile being shown in section;

Fig. 4 is a view taken on line 4—4 of Fig. 3 as indicated by the arrows and

Fig. 5 is a horizontal section taken on line 5—5 of Fig. 4 as indicated by the arrows.

Referring to the drawing, in Figs. 1 and 2 a seat of an automobile of common type is shown comprising the seat portion 10 and the back 11, the latter having lugs 11a hingedly connected by pivots 12 to the arms 13 projecting upwardly from the rear of seat portion 10. Seat portion 10 is also shown as having front legs 14 and rear legs constituting the subject matter of the present invention. These rear legs each comprise a member 15 having an attaching flange 15a with a plurality of circumferentially spaced and countersunk holes therein adapted to receive the screws 16 which will extend into the body or leg-receiving portion of seat 10. Member 15 has a downwardly projecting stem portion 15b which is exteriorly threaded and which is shown as having the central hole countersunk at its lower end extending therethrough adapted to receive an attaching screw 17. Stem 15b has a narow longitudinally extending slot 15c of shallow depth formed in opposite sides thereof. A shell 18 is interiorly threaded so that it can be screwed onto stem 15b, the lower end of shell 18 being shown as closed and provided with a rounded outer surface 18a. The upper portion of shell 18 is cylindrical on its exterior, but the same has flat side portions 18b formed adjacent its lower end the same being arranged in angular formation and as shown extending along the sides of a square. Shell 18 has a narrow slot 18c formed adjacent its upper edge and said shell has secured to the outer side thereof one end of a narrow plate spring 19, said spring being shown as being secured by the headed rivet 20 countersunk at the inner side of shell 18. Spring 19 is bent adjacent its free end to have a bight portion 19a, the sides of which are substantially in contact and which extends through slot 18c, the end thereof being adapted to project into one of the grooves 15c. The spring 19 has its terminal end bent into a small eyelet or loop 19b to form a finger piece for moving said spring outwardly. Spring 19 has a portion at one side cut away adjacent portion 19a to form a shoulder 19c as shown in Fig. 4.

In operation member 15 will be attached to the seat portion 10 of the automobile seat at the rear side thereof, the same being attached by either the screws 16 or 17 or by both. Shell 18 can be turned on stem 15b by withdrawing spring 19a from the grooves 15c. Spring 19 can be withdrawn and pushed downwardly slightly so that the shoulder 19c will engage the outer side of member 18 as shown in dotted lines in Fig. 4. Shell 18 can then be freely turned, and the same can be brought to the position to give the desired height to the seat portion 10. When shell 18 is adjusted as desired, spring 19 can again be permitted to move inward, the end of portion 19a seating in one of the grooves 15c and preventing rotation of shell 18. The shell will then be held stationary in the desired position and the seat will be held at the proper height. Member 18 can ordinarily be readily turned by hand. If necessary a wrench could be placed thereon and engage the flat surfaces 18b.

From the above description it is seen that applicant has provided a very simple and efficient seat elevating device and one by means of which the seat can readily be brought to and held in the desired position. The device can of course be placed on new cars and can readily be used to replace the legs on cars already in use. The screw 17 can be used to hold the device in place if it is not convenient to use the screws 16. The device is quite simple and comprises few parts and can be easily and inexpensively made. The same has been amply demonstrated in actual practice and found to be very successful and efficient.

It will, of course, be understood that various changes may be made in the form, details, proportions and arrangement of the parts without departing from the scope of applicant's invention, which, generally stated, consists in a device capable of carrying out the objects above set forth, in the novel parts and combinations of parts disclosed and defined in the appended claims.

What is claimed is:—

1. A seat elevating device for an automobile seat comprising a member having means for attachment to the seat and an exteriorly threaded stem projecting downwardly therefrom, an interiorly threaded shell threaded on said stem and having a closed end, said stem having a longitudinal groove extending lengthwise of its exterior and a spring secured at one end to said shell and having a free end adapted to extend into said groove to hold said shell in different positions on said stem, said spring having a shoulder formed on its free end adapted to engage the outer side of said shell to hold said spring out of engagement with said stem and outwardly disposed from said groove.

2. A seat elevating device for an automobile seat comprising a member having means for attachment to the seat and an exteriorly threaded stem projecting downwardly therefrom, an interiorly threaded shell threaded on said stem and having a closed end, said stem having a longitudinal groove cut in its exterior surface and a spring comprising a thin plate secured at one end to said shell and extending in semi-circular form about said shell, said spring having an offset bight portion adjacent its free end extending into said slot of said shell and adapted to extend into the groove in said stem, said spring at its free end also having a finger grip portion exterior to said shell for engagement to move said bight portion out of the groove of said stem.

In testimony whereof we affix our signatures.

ORVILLE WILIAM GOLDEN.
JOHN E. GOLDEN.